United States Patent [19]
Hirai et al.

[11] Patent Number: 6,153,140
[45] Date of Patent: Nov. 28, 2000

[54] METHOD AND APPARATUS FOR MOLDING AN INSULATOR DEVICE

[75] Inventors: Koji Hirai; Fusatomo Miyake, both of Aichi, Japan

[73] Assignee: Kabushiki Kaisha Tokai Rika Denki Seisakusho, Aichi, Japan

[21] Appl. No.: 09/091,221

[22] PCT Filed: Dec. 19, 1996

[86] PCT No.: PCT/JP96/03703

§ 371 Date: Jun. 22, 1998

§ 102(e) Date: Jun. 22, 1998

[87] PCT Pub. No.: WO97/23930

PCT Pub. Date: Jul. 3, 1997

[30] Foreign Application Priority Data

Dec. 21, 1995 [JP] Japan ................................. 7-333133

[51] Int. Cl.⁷ .................................................. B29C 45/14
[52] U.S. Cl. .................. 264/272.15; 425/125; 425/129.1
[58] Field of Search ............................ 425/117, 129.1, 425/125; 264/275, 278, 272.15

[56] References Cited

U.S. PATENT DOCUMENTS

| | | | |
|---|---|---|---|
| 3,374,503 | 3/1968 | Boniger | 425/129.1 |
| 4,381,908 | 5/1983 | Roth | 425/129.1 |
| 4,959,000 | 9/1990 | Giza | 425/129.1 |
| 5,458,473 | 10/1995 | Banji | 425/129.1 |

FOREIGN PATENT DOCUMENTS

| | | |
|---|---|---|
| 4-181676 | 6/1992 | Japan . |
| 7-16874 | 1/1995 | Japan . |

*Primary Examiner*—Robert Davis
*Attorney, Agent, or Firm*—Morgan, Lewis & Bockius LLP

[57] ABSTRACT

A molding tool for insert-molding an insulator having a terminal section and an insulating section, the terminal section having a base portion and an upright portion projecting upward from the base portion, the molding tool having a fixed portion contacting against the base portion of the terminal section for support during molding, and a movable portion having a tip holding section for contacting against a tip of the upright portion of the terminal section and a side supporting projection section for contacting against a portion of a side of the upright portion of the terminal section for support during molding, wherein the movable portion is positioned during molding above the fixed portion to form a molding space therebetween along the base portion and extending upwardly toward the tip of the upright portion of the terminal section, but excluding the tip and the portion of the side of the upright portion that contacts against the movable portion, such that when insulation is injected into the molding space during molding to form an insulation section, the side supporting projection section of the movable portion prevents the upright portion of the terminal section from deforming.

8 Claims, 4 Drawing Sheets

METHOD AND APPARATUS FOR MOLDING AN INSULATOR DEVICE

TECHNICAL FIELD

The present invention relates to a device for molding a terminal composed of a base end and a resin section molded in an area extending from the base end to the halfway to a tip end.

BACKGROUND ART

For example, an insulator used in a switching device has such a structure as shown in FIGS. 6 and 7. The insulator 1 includes a terminal 2 bent at a substantially right angle at a bending section 2a at a base end. A resin section 3 having an electric insulating property is provided at the base end and an area of the halfway to a tip end 2b standing from the base end of the terminal 2.

The insulator 1 having such a structure has been conventionally insert-molded by a molding tool 4 as shown in FIGS. 8 and 9. Specifically, the molding tool 4 is composed of a fixed part 5 and a movable part 6. With the tip end 2b of the terminal 2 inserted in a holding section 6a of the movable part 6, molding resin 8 is poured into a molding space 7 formed in the molding tool 4 and solidified. Thereafter, the molding resin 8 is taken out from the molding tool 4 to mold the insulator 1.

However, in the above structure, the terminal is apt to become deformed, as indicated by a two-dot chain line in FIG. 8, owing to the pressure of the resin 8 flowing through the molding space in molding the resin section 3 (the direction of flow of the resin 8 is indicated by arrow A). In order to prevent such deformation, the thickness, width, height or strength of material of the terminal 2 is limited and hence the freedom of design is greatly restricted.

Therefore, an object of the present invention is to provide a device for molding a resin section of a terminal without causing the deformation of a terminal, which can widen the degrees of freedom in the strength and design of the terminal.

DISCLOSURE OF THE INVENTION

In order to attain the above object, the present invention, in a device for molding a terminal device in which in a state where the tip end of a terminal bent at a base end is held in a molding tool, resin having electrically insulating property is poured into a molding space of the molding tool to mold a resin section at the base end of the terminal and an area from the base end to the halfway to the tip end of the terminal, is characterized in that a supporting projecting section is provided in the movable part of the molding tool and, at the time of molding the resin section, the face of the terminal on the opposite side of the face which is apt to receive the pressure of a resin flowing in-a molding space is brought into contact with the supporting projecting section.

In accordance with the means described above, at the time of molding the resin section of the terminal device, even if the face which is apt to receive the pressure of the resin flowing in the molding space of the terminal receives the pressure of the resin, in the terminal, the face of the terminal on the opposite opposite side of the face which is apt to receive the pressure of the resin is supported by the supporting projecting section. Therefore, the deformation of the terminal by the pressure of the resin can be prevented surely.

EMBODIMENTS

Now referring to FIGS. 1–5, an explanation will be given of an embodiment of the present invention.

Figure 3:
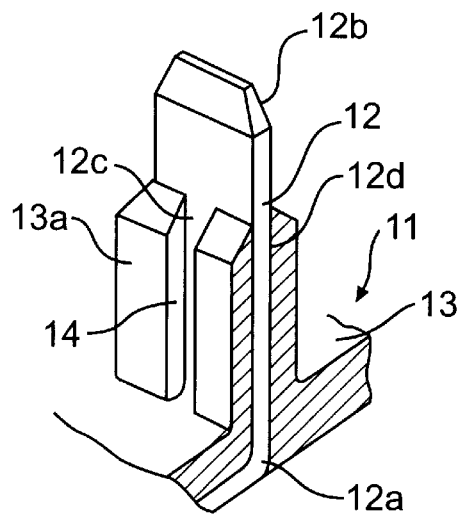
FIG. 3 is a broken perspective view of the insulator.
Figure 4:
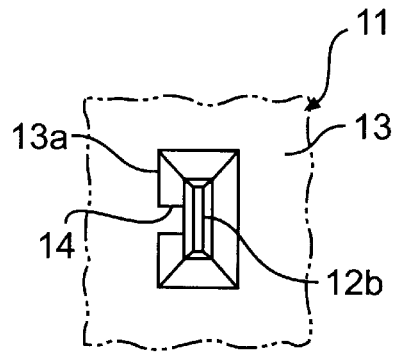
FIG. 4 is a plan view of a terminal portion.
Figure 5:
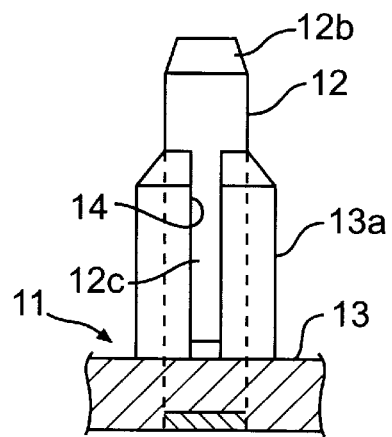
FIG. 5 is a left side view of the terminal portion partially broken.
Figure 6:
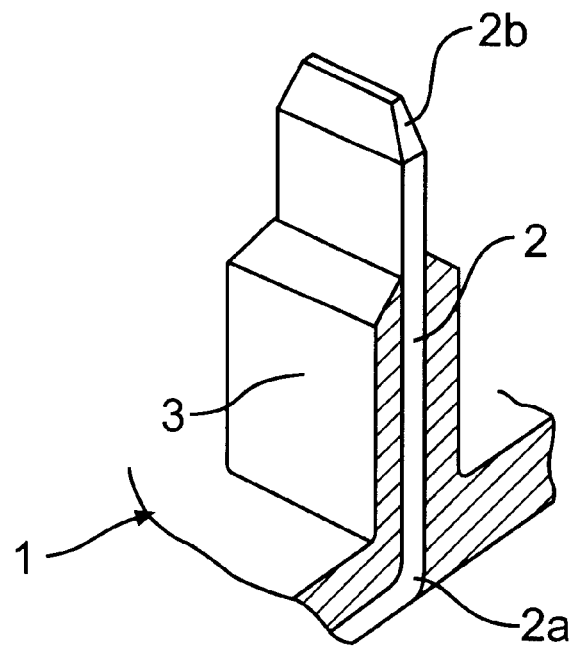
FIG. 6 is a view corresponding to FIG. 3 showing a prior art.
Figure 7:
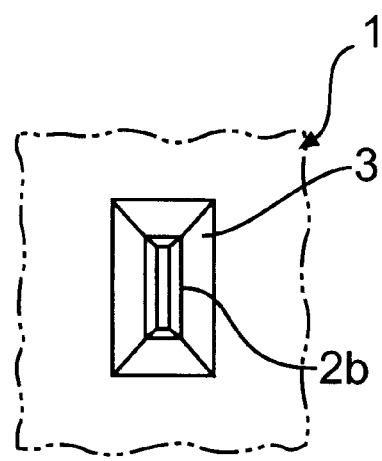
FIG. 7 is a view corresponding to FIG. 4.
Figure 8:
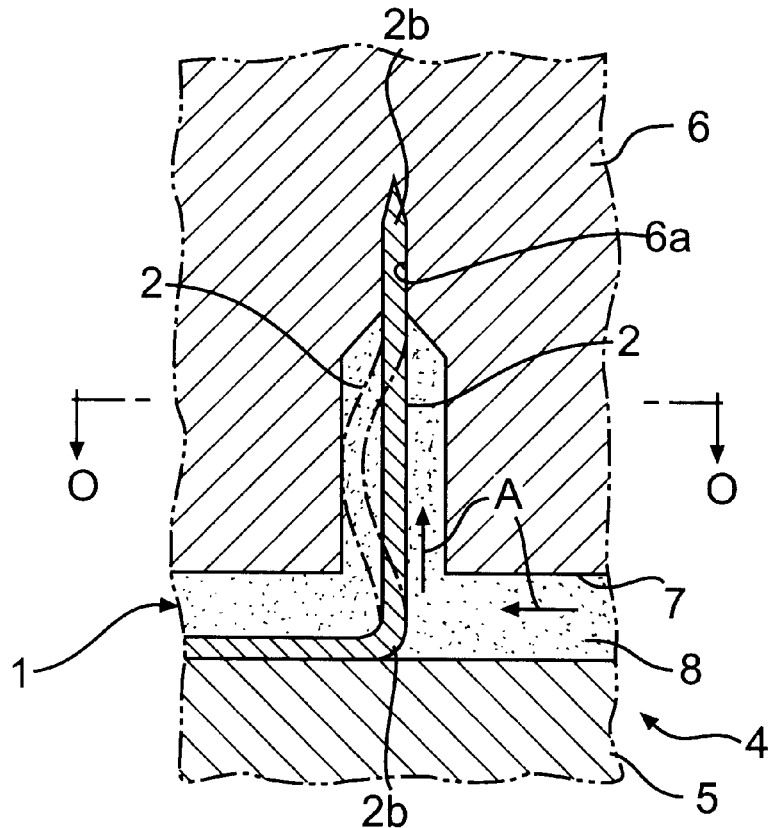
FIG. 8 is a view corresponding to FIG. 1.
Figure 9:
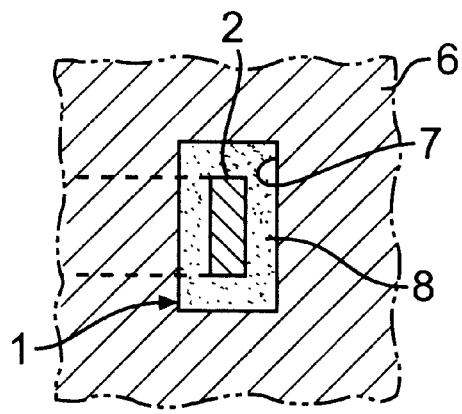
FIG. 9 is a sectional view taken in line b—b in FIG. 8.

FIGS. 3–5 show the state of an insulator 11 serving as a terminal device after it has been molded. The insulator 11 includes a terminal 12 bent at a substantially right angle at a bending section 12a at a base end. A resin section 13 having an electric insulating property is provided at the base end and an area of the halfway to an tip end 12b standing from the base end of the terminal 12. In this case, in the resin section 13, on the one side of an upright section 13a along the terminal 12, a groove section 14 is formed along the terminal 12.

Figure 1:
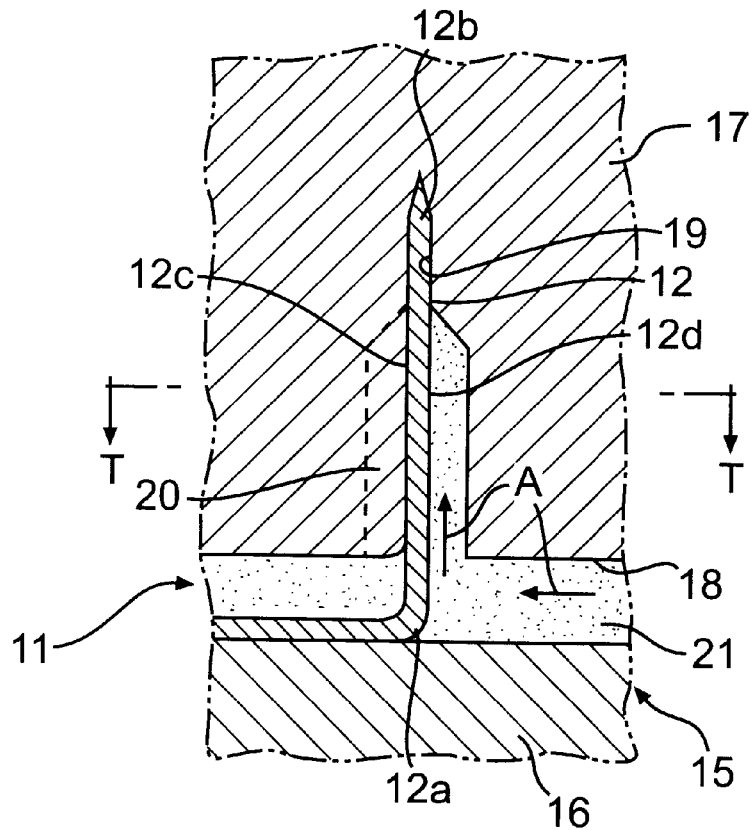
FIG. 1 is a longitudinal sectional view showing one embodiment of the present invention.
Figure 2:
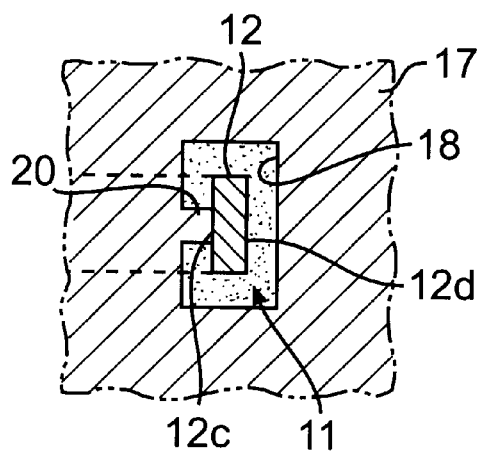
FIG. 2 is a sectional view taken in line a—a in FIG. 2.

The insulator 11 having such a structure is insert-molded by a molding tool 15 as shown in FIGS. 1 and 2. Specifically, the molding tool 15 is composed of a fixed part 16 and a movable part 17. A molding space 18 is formed between the fixed part 16 and the movable part 17.

The movable part 17 includes a holding section 19 for supporting a tip end 12b of the terminal 12 and a supporting projection section 20 in contact with the left side of the terminal 12 which are formed integrally. The supporting projecting section 20 extends from the holding section 19 to the halfway of the base end of the terminal 12.

Thus, where the resin section 13 of the insulator 11 is molded, first, with the terminal 12 set in the molding tool 15, the movable part 17 is clamped to the fixed part 16. In this case, with the tip end 12b of the terminal 12 inserted and held in the holding section 19 of the movable part 17, the left side 12c of the terminal 12 is brought into contact with the supporting projecting section 20. In this state, molding resin 21 is poured into the molding space 18 of the molding tool 15 (the direction of flow of the resin 21 is indicated by arrow A in FIG. 1) and solidified.

At this time, even if the right side 12d, which is apt to receive the pressure of the resin 21 flowing through the molding space, receives the pressure of the resin 21, the left face 12c of the terminal 12, which is on the opposite side of the face which is apt to receive to the pressure of the resin 21, is supported by the supporting projection section 20 so that the deformation of the terminal 12 due to the pressure of the resin 2 can be surely prevented.

The resin 21 is solidified and thereafter taken out from the molding tool 15. Thus, the insulator 11 (FIGS. 3–5) is fabricated. In this case, in the terminal 12, the tip end 12b held in the holding section 19 is exposed from the resin section 13. Further, in the resin section 13, a groove 14 is formed at the area where the supporting projecting section 20 is located.

In accordance with this embodiment, the supporting projecting section 20 is provided in the movable part 17 of the molding tool 15 and, at the time of molding the resin section 13, the left face 12c of the terminal 12 on the opposite side of the right face 12d which is apt to receive the pressure of the resin 21 flowing in the molding space 18 is brought into contact with the supporting projecting section 20. Therefore, the deformation of the terminal 12 by the pressure of the resin 21 can be prevented surely. Thus, the degrees of freedom in the strength (thickness, width or height of the terminal 12 or hardness of the material) and hence design of the terminal can widened.

In the above embodiment, the insulator 11 has been molded as the terminal device. However, the present invention can be applied to the device for molding a connector in which a case section of resin is provided in a terminal by molding.

As apparent from the explanation hitherto made, in accordance with the present invention, at the time of molding the resin section of the terminal device, even if the face which is apt to receive the pressure of the resin flowing in the molding space of the terminal receives the pressure of the resin, the face of the terminal on the opposite side of the face which is apt to receive the pressure of the resin is supported by the supporting projecting section. Therefore, the deformation of the terminal by the pressure of the resin can be prevented surely. Thus, the degrees of freedom in the strength (thickness, width or height of the terminal 12 or hardness of the material) and hence design of the terminal can widened. Thus, the degrees of freedom in the strength and hence design of the terminal can be widened.

What is claimed is:

1. A molding tool for insert-molding an insulator material around portions of a terminal, comprising:

a fixed portion for supporting the terminal; and a movable portion having a supporting projecting section for contacting a portion of the terminal during molding, and having a molding space formed about remaining portions of the terminal, such that the supporting projection section prevents the terminal from deforming when the molding space is injected with the insulator material around portions of the terminal wherein the terminal has a base portion and an upright portion projecting upward from the base portion.

2. The molding tool according to claim 1, wherein the fixed portion contacts the base portion of the terminal for support during molding, and the movable portion has a tip holding section for contacting a tip of the upright portion of the terminal during molding.

3. The molding tool according to claim 1, wherein the supporting projection section contacts a side of the upright portion of the terminal.

4. A molding tool for insert-molding an insulator having a terminal section and an insulating section, the terminal section having a base portion and an upright portion projecting upward from the base portion, the molding tool comprising:

a fixed portion contacting the base portion of the terminal section for support during molding; and a movable portion having a tip holding section for contacting a tip of the upright portion of the terminal section and a side supporting projection section for contacting a portion of a side of the upright portion of the terminal section for support during molding, wherein during molding the movable portion is positioned above the fixed portion to form a molding space therebetween along the base portion and extending upwardly toward the tip of the upright portion of the terminal section, such that when insulation is injected into the molding space during molding to form an insulation section, the side supporting projection section of the movable portion prevents the upright portion of the terminal section from deforming.

5. The molding tool according to claim 4, wherein the side supporting projection section of the movable portion contacts only a portion of the side of the upright portion of the terminal section.

6. A method for insert-molding an insulator having a terminal section and an insulating section, the terminal section having a base portion and an upright portion projecting upward from the base portion, comprising the steps of:

supporting the base portion of the terminal section against a fixed surface;

placing a mold upon the terminal section to contact against a tip and only a portion of a side of the upright portion of the terminal section, thereby forming a molding space along the base portion and extending upwardly toward the tip of the upright portion of the terminal, but excluding the tip and the portion of the side of the upright portion that contacts against the movable portion; and injecting insulation into the molding space to form an insulation section, wherein
   the side of the upright portion of the terminal section contacts against the mold to prevent the upright portion from deforming as the insulation is pressed against the upright portion of the terminal section during molding.

7. A molding tool for insert-molding an insulator having a terminal section and an insulating section, the terminal section having a base portion and an upright portion projecting upward from the base portion, the molding tool comprising:

a fixed portion contacting the base portion of the terminal section for support during molding; and a movable portion having a tip holding section for contacting a tip of the upright portion of the terminal section and a side supporting projection section for contacting a portion of a side of the upright portion of the terminal section when positioned above the fixed portion during molding, such that a molding space is formed along the base portion and extending upwardly toward the tip of the upright portion of the terminal section, and the side supporting projection section of the movable portion prevents the upright portion of the terminal section from deforming when insulation is injected into the molding space during molding to form the insulation section of the insulator.

8. The molding tool according to claim 7, wherein the side supporting projection section of the movable portion contacts only a portion of the side of the upright portion of the terminal section.

* * * * *